United States Patent
Wang et al.

(10) Patent No.: US 11,545,836 B2
(45) Date of Patent: Jan. 3, 2023

(54) PHOTOVOLTAIC ENERGY STORAGE SYSTEM AND CONTROL METHOD THEREOF

(71) Applicant: Delta Electronics, Inc., Taoyuan (TW)

(72) Inventors: Changyong Wang, Taoyuan (TW); Yangyang She, Taoyuan (TW); Li Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/535,284

(22) Filed: Nov. 24, 2021

(65) Prior Publication Data
US 2022/0294226 A1 Sep. 15, 2022

(30) Foreign Application Priority Data
Mar. 10, 2021 (CN) .......................... 202110260427.5

(51) Int. Cl.
*H02J 3/38* (2006.01)
*G01R 19/25* (2006.01)
(Continued)

(52) U.S. Cl.
CPC ............... *H02J 3/381* (2013.01); *H02J 3/32* (2013.01); *H02M 3/158* (2013.01); *H02J 2300/26* (2020.01)

(58) Field of Classification Search
CPC .......... H02J 3/381; H02J 3/32; H02J 2300/26; H02M 3/158
See application file for complete search history.

(56) References Cited

U.S. PATENT DOCUMENTS 8,212,409 B2   7/2012   Bettenwort et al.
8,310,094 B2   11/2012  Yamada et al.
(Continued)

FOREIGN PATENT DOCUMENTS

CN    108432080 A    8/2018
CN    208226582 U    12/2018
(Continued)

OTHER PUBLICATIONS

Ha Pham N., Direct Storage Hybrid (DSH) Inverter: A New Concept of Intelligent Hybrid Inverter, IEEE, 2017, pp. 5529-5536.

*Primary Examiner* — Toan T Vu
(74) *Attorney, Agent, or Firm* — Kirton McConkie; Evan R. Witt (57) ABSTRACT

A photovoltaic energy storage system includes an energy storage device, an inverter, a photovoltaic array device, a DC/DC conversion device and a controller. When an output voltage of the photovoltaic array device is greater than or equal to a predetermined threshold value, the photovoltaic energy storage system is operated in a first working mode. When the output voltage of the photovoltaic array device is lower than the predetermined threshold value, the photovoltaic energy storage system is operated in a second working mode. The DC/DC conversion device includes a bypass switch and a DC/DC converter. When the photovoltaic energy storage system is operated in the second working mode, the bypass switch is turned on and the DC/DC converter is disabled. Consequently, the electric power of the energy storage device is transmitted to the inverter through the bypass switch.

13 Claims, 7 Drawing Sheets

(51) Int. Cl.
    *H02J 3/32*       (2006.01)
    *H02M 3/158*      (2006.01)

(56) References Cited

U.S. PATENT DOCUMENTS

| | | | |
|---|---|---|---|
| 10,404,072 B2 | 9/2019 | Palombini et al. | |
| 2019/0052092 A1* | 2/2019 | Palombini | H02M 7/797 |
| 2019/0334349 A1* | 10/2019 | Liu | G05B 19/045 |
| 2021/0211066 A1* | 7/2021 | Vavilpalli | H02J 3/48 |

FOREIGN PATENT DOCUMENTS

| | | |
|---|---|---|
| CN | 107425811 B | 9/2019 |
| JP | 2013051833 A | 3/2013 |
| JP | 2015133870 A | 7/2015 |

\* cited by examiner

PHOTOVOLTAIC ENERGY STORAGE SYSTEM AND CONTROL METHOD THEREOF

CROSS-REFERENCE TO RELATED APPLICATION

This application claims priority to China Patent Application No. 202110260427.5, filed on Mar. 10, 2021, the entire contents of which are incorporated herein by reference for all purposes.

FIELD OF THE INVENTION

The present disclosure relates to a photovoltaic power system, and more particularly to a photovoltaic energy storage system and a control method of the photovoltaic energy storage system.

BACKGROUND OF THE INVENTION

With the rapid development of global industrialization, the demands on energy resources are increasing. At present, the fossil energy stored on the earth is gradually exhausted, and the energy issues and the environmental issues have accelerated the development of the new energy industry. Nowadays, solar energy occupies an important proportion of the new energy industry because of many benefits such as renewable, pollution-free and large storage capacity.

As the distributed photovoltaic power generation system is used in commercial buildings, industrial parks and other places, the penetration of the distributed photovoltaic power generation system in the power grid is gradually increased and the influence of the distributed photovoltaic power generation system on the power grid is increased. Since the distributed photovoltaic power generation system is greatly affected by the weather, the fluctuation of the distributed photovoltaic power generation system is large. Moreover, in the night without the sunlight, the distributed photovoltaic power generation system cannot output electric power. In order to reduce the influence of the distributed photovoltaic power generation system on the power grid and ensure the power output in the night, the energy storage system and the photovoltaic power generation system are usually combined as a photovoltaic energy storage system.

The technology of combining the power storage system and the photovoltaic power generation system as the photovoltaic energy storage system has the following advantages. Firstly, a function of a peak load shifting is achieved. In the load valley condition, the generated electric power from the photovoltaic power generation system is stored in the energy storage system. In the load peak condition, the electric power is released. Consequently, the peak output capacity of the power grid is increased. Secondly, the power quality of the power grid can be controlled. The energy storage system can control the electric power, for example stabilize the voltage, adjust the phase angle, and so on. Consequently, the power quality of the photovoltaic power generation system is improved. Thirdly, the application on a microgrid is achieved. The photovoltaic energy storage system can provide stable electric power to the load throughout the day. Instead, the energy storage system can provide electrical energy to the load in the night without sunlight.

Therefore, there is a need of providing a photovoltaic energy storage system with high efficiency and a control method of the photovoltaic energy storage system.

SUMMARY OF THE INVENTION

The present disclosure provides a photovoltaic energy storage system and a control method in order to reduce the fabricating cost and the power loss.

In accordance with an aspect of the present disclosure, a photovoltaic energy storage system is provided. The photovoltaic energy storage system includes an energy storage device, an inverter, a photovoltaic array device, a DC/DC conversion device and a controller. The inverter includes a DC terminal and an AC terminal. The AC terminal is electrically coupled with a power grid. The photovoltaic array device is electrically connected with the DC terminal of the inverter directly. When a magnitude of an output voltage of the photovoltaic array device is greater than or equal to a predetermined threshold value, the photovoltaic energy storage system is operated in a first working mode. When the magnitude of the output voltage of the photovoltaic array device is lower than the predetermined threshold value, the photovoltaic energy storage system is operated in a second working mode. The DC/DC conversion device is electrically connected between the energy storage device and the DC terminal of the inverter. The DC/DC conversion device includes a bypass switch and a DC/DC converter, which are electrically connected with each other in parallel. The controller is used for controlling an operation of the inverter and an operation of the DC/DC conversion device. When the photovoltaic energy storage system is operated in the first working mode, the controller performs a maximum power point tracking calculation, and controls the operation of the inverter according to a result of the maximum power point tracking calculation, so that a voltage of the DC terminal of the inverter is adjusted. When the photovoltaic energy storage system is operated in the second working mode, the bypass switch is turned on and the DC/DC converter is disabled under control of the controller, so that an electric power of the energy storage device is transmitted to the inverter through the bypass switch.

In accordance with another aspect of the present disclosure, a control method for a photovoltaic energy storage system is provided. The photovoltaic energy storage system includes an energy storage device, an inverter, a photovoltaic array device and a DC/DC conversion device. An AC terminal of the inverter is electrically coupled with a power grid. The photovoltaic array device is electrically connected with a DC terminal of the inverter. The DC/DC conversion device is electrically connected between the energy storage device and the DC terminal of the inverter. The DC/DC conversion device includes a bypass switch and a DC/DC converter, which are electrically connected with each other in parallel. The control method includes the following steps. Firstly, the controller determines whether a magnitude of an output voltage of the photovoltaic array device is greater than or equal to a predetermined threshold value. When the magnitude of the output voltage of the photovoltaic array device is greater than or equal to the predetermined threshold value, the photovoltaic energy storage system is operated in a first working mode. In the first working mode, the controller performs a maximum power point tracking calculation, and controls the operation of the inverter according to a result of the maximum power point tracking calculation, so that a voltage of the DC terminal of the inverter is adjusted. When the magnitude of the output voltage of the photovoltaic array device is lower than the predetermined threshold value, the photovoltaic energy storage system is operated in a second working mode. In the second working mode, the bypass switch is turned on and the DC/DC converter is disabled under control of the controller, so that an electric power of the energy storage device is transmitted to the inverter through the bypass switch.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Conventionally, the architectures of the photovoltaic energy storage system are classified into two types.

In the first type architecture of the photovoltaic energy storage system, the energy storage system and the photovoltaic power generation system are coupled with each other in the AC grid side. That is, the energy storage system is electrically connected to the AC grid side through a DC/AC converter and a transformer of the energy storage system sequentially. By using the first architecture of the photovoltaic energy storage system, the electric power from the photovoltaic side (photovoltaic array) of the photovoltaic power generation system can be outputted to the AC power grid, and the battery of the energy storage system can be charged by the electric power from the photovoltaic side. Consequently, the energy storage system can achieve the function of the peak load shifting and optimize the power quality. However, since the energy storage system in the first type architecture of the photovoltaic energy storage system is equipped with the DC/AC converter and the transformer, the cost of the energy storage system is higher. Moreover, before the electric power charges the battery of the energy storage system, the electric power has to be transferred through the DC/AC converter and the transformer of the photovoltaic power generation system and the DC/AC converter and the transformer of the energy storage system. Since the electric power has to be transferred through many conversion stage, the power loss is large.

In the second type architecture of the photovoltaic energy storage system, the energy storage system and the photovoltaic power generation system are coupled with each other in the DC side. That is, the DC side of the energy storage system and the photovoltaic array of the photovoltaic power generation system are electrically connected in a combiner box of a DC/AC converter of the photovoltaic power generation system, and then electrically connected to the AC grid side through a DC/AC converter and a transformer of the photovoltaic power generation system. In comparison with the first type architecture, the second type architecture omits the DC/AC converter and the transformer in the energy storage system, and the energy storage system is additionally equipped with a DC/DC converter between the output terminal of the photovoltaic array and the battery. Consequently, the electric power from the photovoltaic array can be transferred through the DC/DC converter to charge the battery of the energy storage system. Consequently, the second type architecture can reduce the fabricating cost, and the charging efficiency of the energy storage system by the photovoltaic array is enhanced. However, the second type architecture still has some drawbacks. For example, when the energy storage system needs to discharge electric power to the power grid, the electric power has to be transferred through the DC/DC converter of the energy storage system, and the DC/AC converter and the transformer of the photovoltaic power generation system. Since the electric power needs to be transferred through many conversion stage, the power loss is still large, and the system efficiency cannot be increased.

Figure 1:
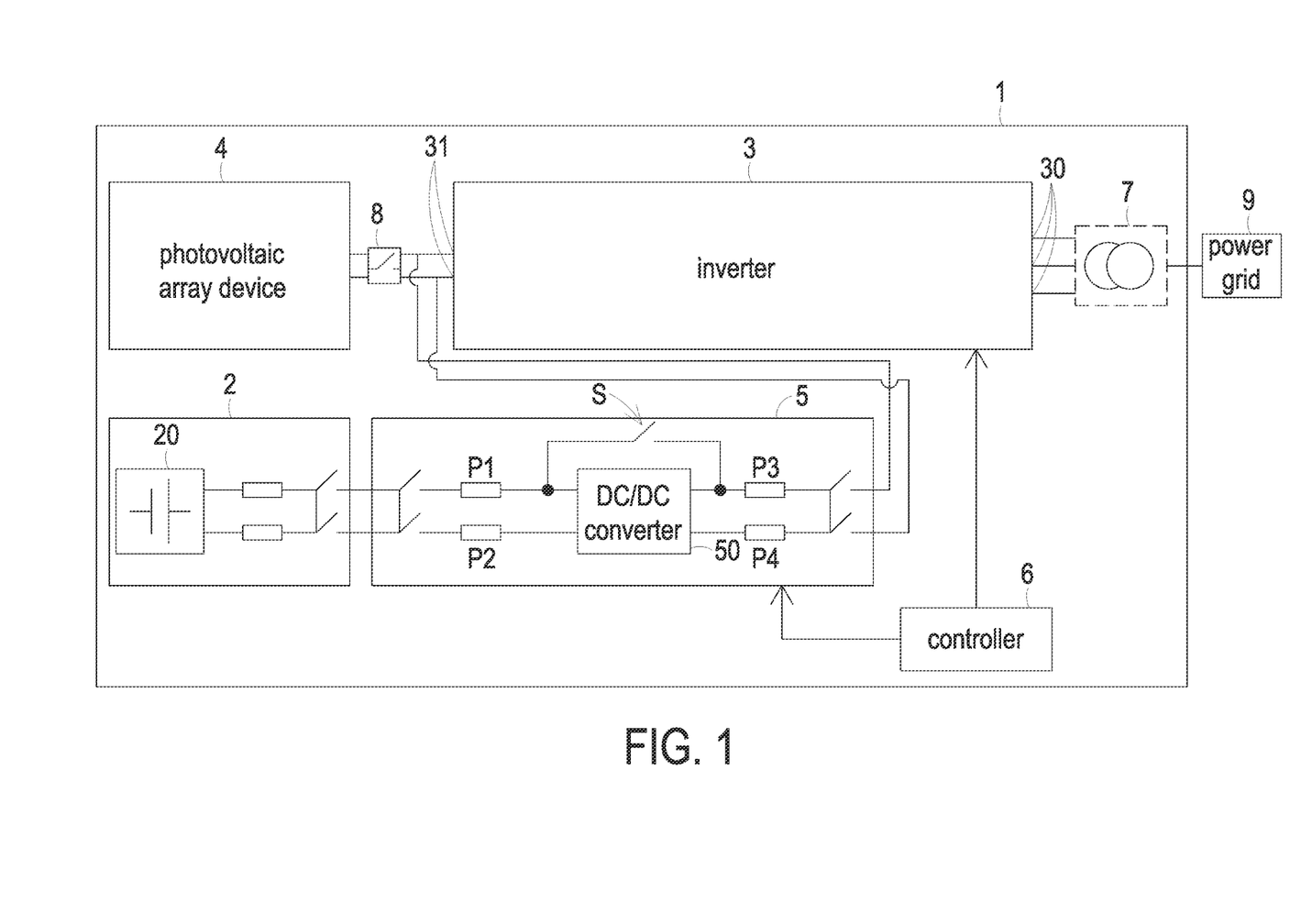
FIG. 1 is a schematic circuit diagram illustrating the architecture of a photovoltaic energy storage system according to an embodiment of the present disclosure.
Figure 2:
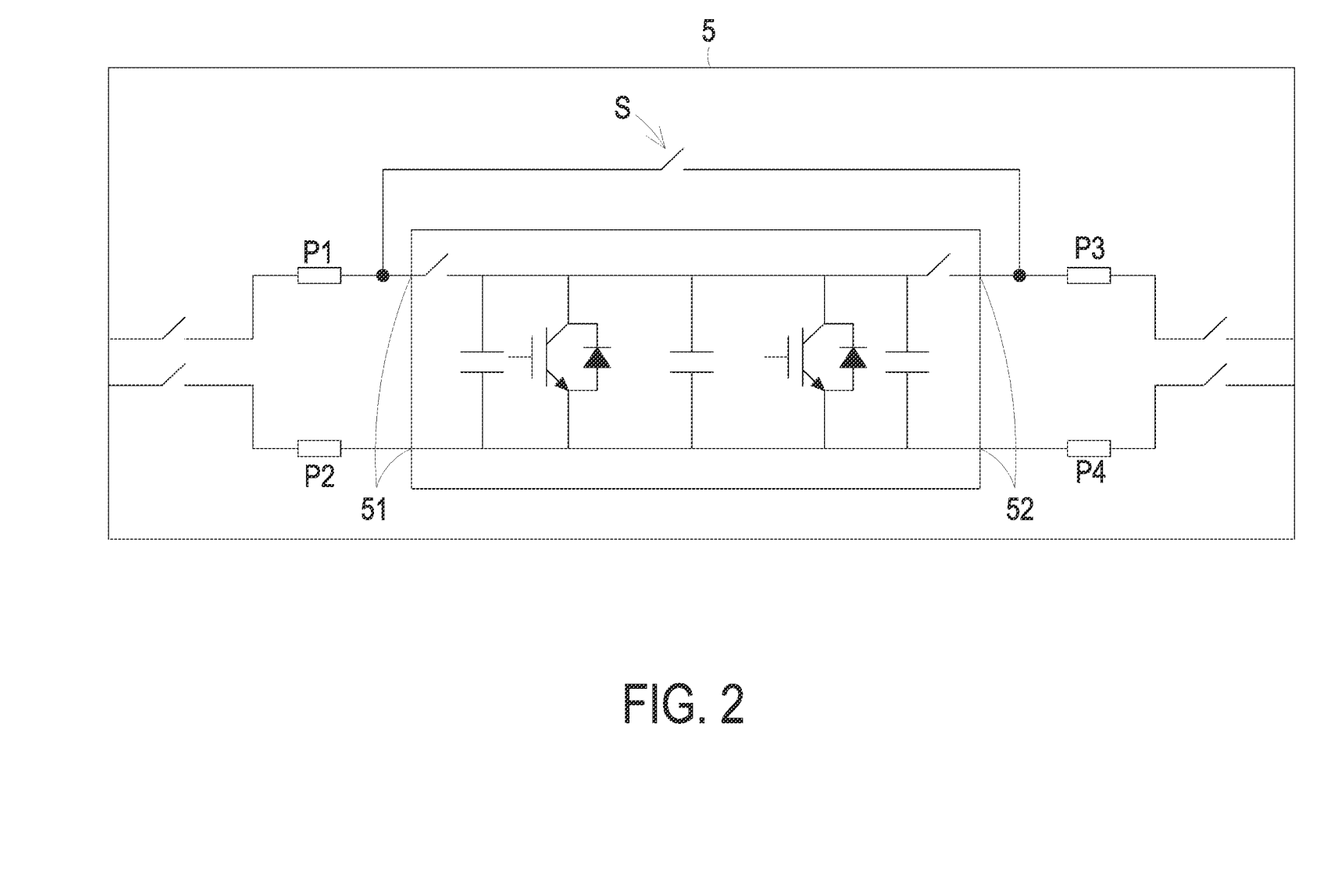
FIG. 2 is a schematic circuit diagram illustrating the circuitry structure of the DC/DC conversion device of the photovoltaic energy storage system as shown in FIG. 1.

FIG. 1 is a schematic circuit diagram illustrating the architecture of a photovoltaic energy storage system according to an embodiment of the present disclosure. FIG. 2 is a schematic circuit diagram illustrating the circuitry structure of the DC/DC conversion device of the photovoltaic energy storage system as shown in FIG. 1. As shown in FIG. 1 and FIG. 2, the photovoltaic energy storage system 1 includes an energy storage device 2, an inverter 3, a photovoltaic array device 4, a DC/DC conversion device 5 and a controller 6.

Preferably but not exclusively, the photovoltaic array device 4 includes at least a photovoltaic string (not shown). The photovoltaic array device 4 can output a DC voltage. If the photovoltaic energy storage system 1 is in the situation with sufficient solar energy (e.g., in a sunny day), the magnitude of the output voltage from the photovoltaic array device 4 is greater than or equal to a predetermined threshold value. Under this circumstance, the photovoltaic energy storage system 1 is operated in a first working mode. Whereas, if the photovoltaic energy storage system 1 is in a situation with insufficient solar energy (e.g., in a rainy day or in a night), the magnitude of the output voltage from the photovoltaic array device 4 is lower than the predetermined threshold value. Under this circumstance, the photovoltaic energy storage system 1 is operated in a second working mode.

The energy storage device 2 includes at least one chargeable battery 20. The energy storage device 2 can be charged or discharged. When the energy storage device 2 is discharged, a DC power with a storage voltage is outputted from the energy storage device 2.

The inverter 3 includes an AC terminal 30 and a DC terminal 31. The DC terminal 31 of the inverter 3 is electrically connected with the photovoltaic array device 4.

Consequently, the DC terminal 31 of the inverter 3 can receive the output voltage from the photovoltaic array device 4. The AC terminal 30 of the inverter 3 is electrically coupled with a power grid 9. When the inverter 3 receives the DC power from the photovoltaic array device 4 through the DC terminal 31, the DC power is converted into an AC power by the inverter 3. In addition, the AC power is sent from the AC terminal 30 of the inverter 3 to the power grid 9.

As mentioned above, the photovoltaic array device 4 is electrically connected with the DC terminal 31 of the inverter 3. Consequently, when the photovoltaic array device 4 is operated normally, the output voltage of the photovoltaic array device 4 needs to match the voltage of the DC terminal 31 of the inverter 3. In other words, when the photovoltaic energy storage system 1 is operated in the first working mode, the output voltage range of the photovoltaic array device 4 and the voltage range of the DC terminal 31 match each other.

The DC/DC conversion device 5 includes a bypass switch S and a DC/DC converter 50, which are electrically connected with each other in parallel. The bypass switch S and the DC/DC converter 50 are electrically connected between the energy storage device 2 and the DC terminal 31 of the inverter 3. During the operation of the DC/DC conversion device 5, the received DC power can be converted into some regulated DC voltages with different amplitudes by the DC/DC converter 50. Consequently, the storage device 2 is charged by the regulated DC voltage. The bypass switch S can be selectively turned on or turned off. When the bypass switch S is turned off, the electric power can be transferred through the DC/DC converter 50 only. When the bypass switch S is turned on, the electric power can be transferred through the bypass switch S only, while the electric power cannot be transferred through the DC/DC converter 50.

The controller 6 is coupled with the inverter 3 and DC/DC conversion device 5. The controller 6 can control the operations of the inverter 3 and the DC/DC conversion device 5. Moreover, the controller 6 can control the on/off states of the bypass switch S of the DC/DC conversion device 5 and selectively enable or disable the DC/DC converter 50. When the photovoltaic energy storage system 1 is operated in the first working mode, the bypass switch S is turned off and the DC/DC converter 50 is enabled by the controller 6. Whereas, when the photovoltaic energy storage system 1 is operated in the second working mode, the bypass switch S is turned on and the DC/DC converter 50 is disabled by the controller 6.

Figure 3A:
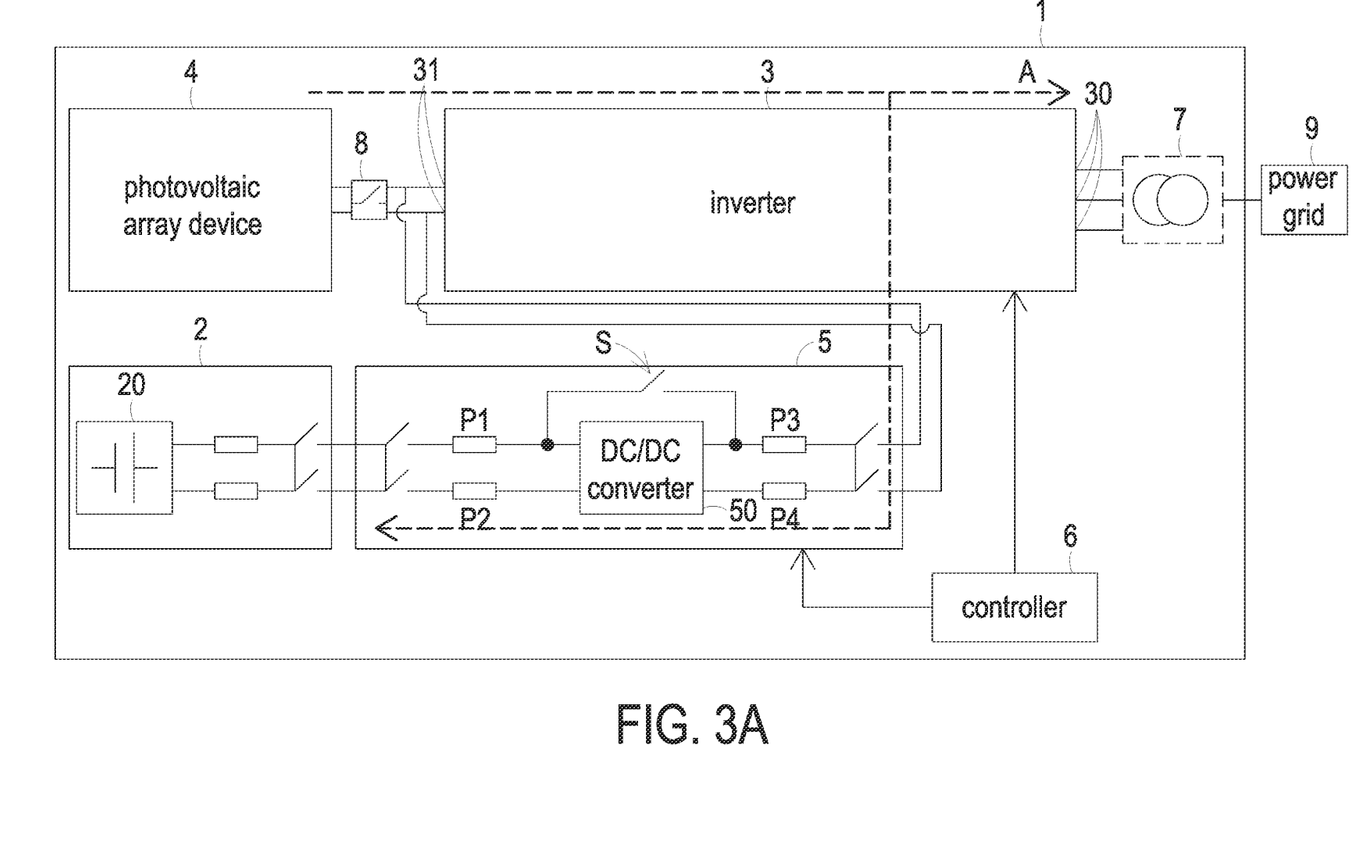
FIG. 3A is a schematic circuit diagram illustrating the flowing direction of the electric power in the photovoltaic energy storage system as shown in FIG. 1 when the photovoltaic energy storage system is in a first working mode.
Figure 3B:
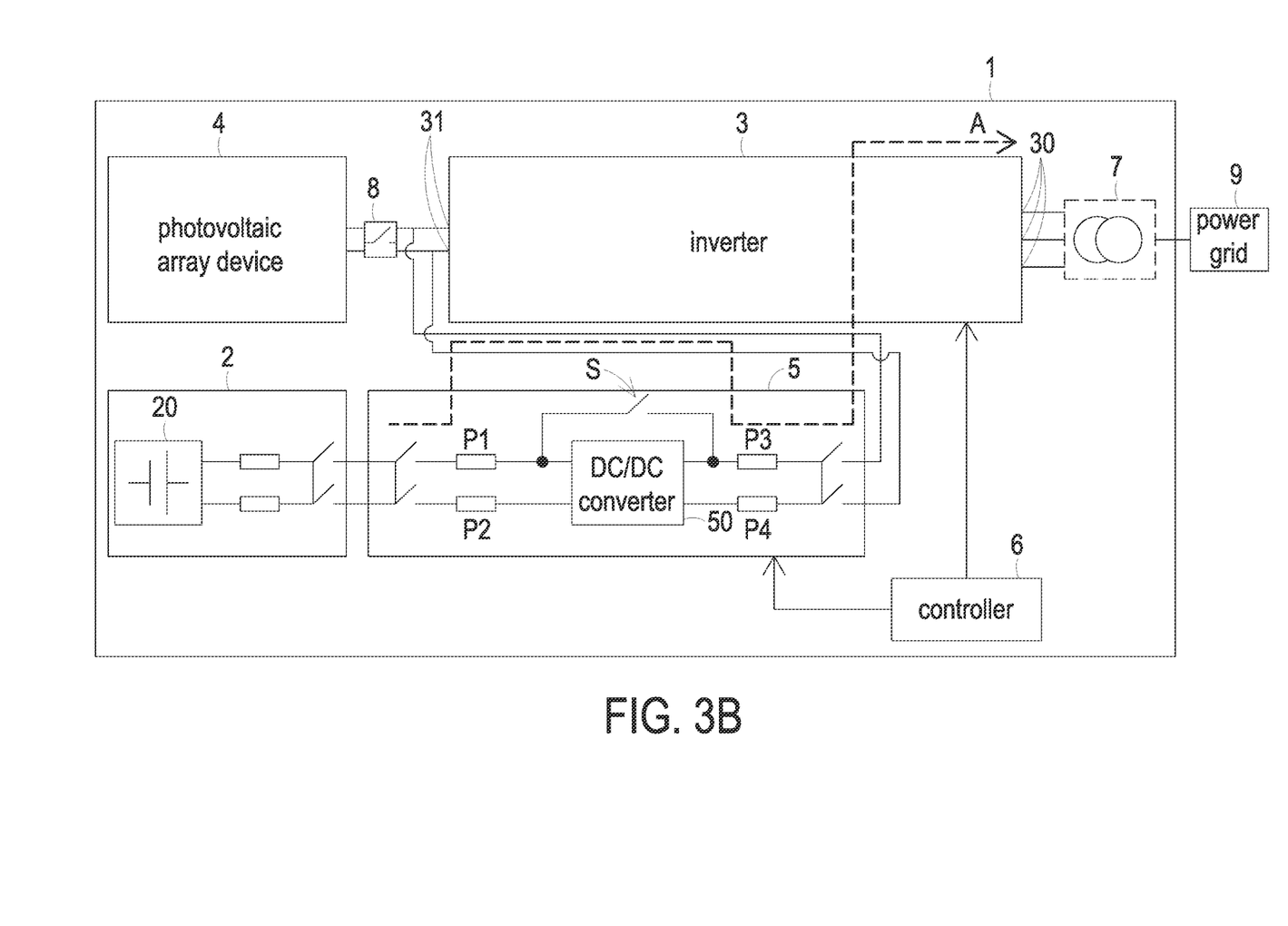
FIG. 3B is a schematic circuit diagram illustrating the flowing direction of the electric power in the photovoltaic energy storage system as shown in FIG. 1 when the photovoltaic energy storage system is in a second working mode.

Hereinafter, the operations of the photovoltaic energy storage system 1 in the first working mode and the second working mode will be described in more details with reference to FIGS. 3A and 3B. FIG. 3A is a schematic circuit diagram illustrating the flowing direction of the electric power in the photovoltaic energy storage system as shown in FIG. 1 when the photovoltaic energy storage system is in a first working mode. FIG. 3B is a schematic circuit diagram illustrating the flowing direction of the electric power in the photovoltaic energy storage system as shown in FIG. 1 when the photovoltaic energy storage system is in a second working mode. In FIG. 3A and FIG. 3B, the dotted arrow A denotes the flowing direction of the electric power.

When the magnitude of the output voltage from the photovoltaic array device 4 is greater than or equal to the predetermined threshold value, the photovoltaic energy storage system 1 is operated in the first working mode. In the first working mode, the output voltage from the photovoltaic array device 4 is transmitted to the inverter 3 through the DC terminal 31 of the inverter 3. Under control of the controller 6, the output voltage from the photovoltaic array device 4 is converted into an AC power by the inverter 3. The AC power is transmitted to the power gird 9 through an AC terminal 30 of the inverter 3. Moreover, when the magnitude of the output power of the photovoltaic array device 4 is greater than the rated power of the inverter 3, a portion of the DC output power of the photovoltaic array device 4 is transmitted to the energy storage device 2 through the DC/DC converter 50. Under control of the controller 6, the bypass switch S is turned off, and the DC/DC converter 50 is enabled. The excess portion of the DC output power of the photovoltaic array device 4 is converted into the DC voltages with different amplitudes by the DC/DC converter 50. Consequently, the energy storage device 2 is charged.

When the magnitude of the output voltage from the photovoltaic array device 4 is lower than the predetermined threshold value, the photovoltaic energy storage system 1 is operated in the second working mode. In the second working mode, the required electric power of the power grid 9 is provided by the energy storage device 2. Under control of the controller 6, the bypass switch S is turned on, and the DC/DC converter 50 is disabled. Meanwhile, the storage voltage from the energy storage device 2 is not transmitted through the DC/DC converter 50. The electric power from the energy storage device 2 is directly transmitted to the DC terminal 31 of the inverter 3 through the bypass switch S. Moreover, under control of the controller 6, the storage voltage from the energy storage device 2 is converted into the AC power by the inverter 3. Then, the AC power is sent to the power gird 9 through the AC terminal 30 of the inverter 3.

In accordance with a feature of the present disclosure, when the photovoltaic energy storage system 1 is operated in the second working mode, the bypass switch S is turned on and the DC/DC converter 50 is disabled under control of the controller 6. The electric power of the energy storage device 2 is directly transmitted to the inverter 3 through the bypass switch S. Since it is not necessary to additionally install a DC/AC converter and a transformer in the energy storage system, the cost of the photovoltaic energy storage system 1 is reduced when compared with the first type architecture of the conventional photovoltaic energy storage system. In addition, since the electric power does not need to be transferred through too many conversion stages, the power loss is reduced significantly. When the photovoltaic storage energy system 1 is operated in the second working mode, the electric power of the energy storage device 2 is transmitted to the inverter 3 through the bypass switch S. In addition, the electric power of the energy storage device 2 does not need to be transmitted through the DC/DC converter 50. Since the electric power does not need to be transferred through too many conversion stages, the power loss is reduced when compared with the second type architecture of the conventional photovoltaic energy storage system.

In accordance with another feature of the present disclosure, when the photovoltaic energy storage system 1 is operated in the first working mode, the controller 6 performs a maximum power point tracking (MPPT) calculation. Furthermore, the controller 6 controls the operations of the inverter 3 according to the result of the MPPT calculation and thus adjusts the voltage of the DC terminal 31 of the inverter 3. Consequently, the photovoltaic array device 4 can be operated at the maximum power point. In this way, the efficiency of the photovoltaic energy storge system is improved.

In some embodiments, the working voltage range of the energy storage device 2 matches the working voltage range of the inverter 3. When the photovoltaic energy storage system 1 is operated in the second working mode, the electric power of the energy storage device 2 can be directly transmitted to the inverter 3 through the bypass switch S, and not transmitted through the DC/DC converter 50 for voltage conversion. Preferably but not exclusively, the working voltage range of the energy storage device 2 is in the range between 875V and 1500V.

In some embodiments, the bypass switch S is an isolated switch, a contactor or a relay. Alternatively, the bypass switch S is a semiconductor switch, e.g., a solid-state relay or a transistor. In addition, the DC/DC converter 50 is a bidirectional DC/DC converter that can convert electric power in a bidirectional manner, for example, a bidirectional buck-boost converter. That is, the electric power can be transmitted from the DC terminal 31 of the inverter 3 to the energy storage device 2 through the DC/DC converter 50, and the electric power can also be transmitted from the energy storage device 2 to the DC terminal 31 of the inverter 3 through the DC/DC converter 50. As shown in FIG. 2, the first DC terminal 51 of the DC/DC converter 50 is electrically connected with the energy storage device 2. The DC voltage range of the first DC terminal 51 needs to match the voltage of the chargeable battery 20 of the energy storage device 2. As shown in FIG. 2, a second DC terminal 52 of the DC/DC converter 50 is electrically connected with the DC terminal 31 of the inverter 3. The DC voltage range of the second DC terminal 52 needs to match the voltage range of the photovoltaic array device 4. As mentioned above, when the photovoltaic energy storage system 1 is operated in the second working mode, the DC/DC converter 50 is disabled. As a consequence, the unidirectional DC/DC converter is suitably used as the DC/DC converter 50. That is, the DC/DC converter 50 merely allows the electric power to be transmitted from the DC terminal 31 of the inverter 3 to the energy storage device 2. The cost of the unidirectional DC/DC converter is lower than the bidirectional DC/DC converter. That is, the cost of the hardware design and the software design can be reduced. In addition, when the photovoltaic energy storage system 1 is operated in the first working mode and the energy storage device 2 is charged by the DC/DC converter 50, the output voltage of the DC/DC converter 50 can be controlled by the controller 6, and the energy storage device 2 can be charged by the output voltage. In another embodiment, by controlling the output current of the DC/DC converter 50, the energy storage device 2 can also be charged.

In other embodiments, the photovoltaic energy storage system 1 further includes a transformer 7. The transformer 7 is electrically connected between the AC terminal 30 of the inverter 3 and the power grid 9. The output power of the AC terminal 30 of the inverter 3 is transmitted to the power grid 9 through the transformer 7. In addition, the photovoltaic energy storage system 1 further includes a plurality of protection elements. For example, as shown in FIG. 2, four protection elements P1, P2, P3 and P4 are provided. The protection element P1 is electrically connected with a positive terminal of the first DC terminal 51 of the DC/DC converter 50. The protection element P2 is electrically connected with a negative terminal of the first DC terminal 51 of the DC/DC converter 50. The protection element P3 is electrically connected with a positive terminal of the second DC terminal 52 of the DC/DC converter 50. The protection element P4 is electrically connected with a negative terminal of the second DC terminal 52 of the DC/DC converter 50.

The protection elements P1, P2, P3 and P4 are used to break the circuit when an overcurrent event occurs. Preferably but not exclusively, the protection elements P1, P2, P3 and P4 are fuses.

Please refer to FIG. 1 again. In some embodiments, the photovoltaic energy storage system 1 further includes a protection switch 8. The protection switch 8 is electrically connected between the photovoltaic array device 4 and the DC terminal 31 of the inverter 3. The protection switch 8 can be selectively turned on or turned off. When the photovoltaic energy storage system 1 is operated in the first working mode, the protection switch 8 is turned on. When the photovoltaic energy storage system 1 is operated in the second working mode, the protection switch 8 is turned off. Consequently, the electric power cannot be transmitted from the photovoltaic array device 4 to the inverter 3, and the photovoltaic array device 4 will not receive the reverse power flow. Preferably but not exclusively, the protection switch 8 is a mechanical switch (e.g., a relay) or a diode.

Figure 4A:
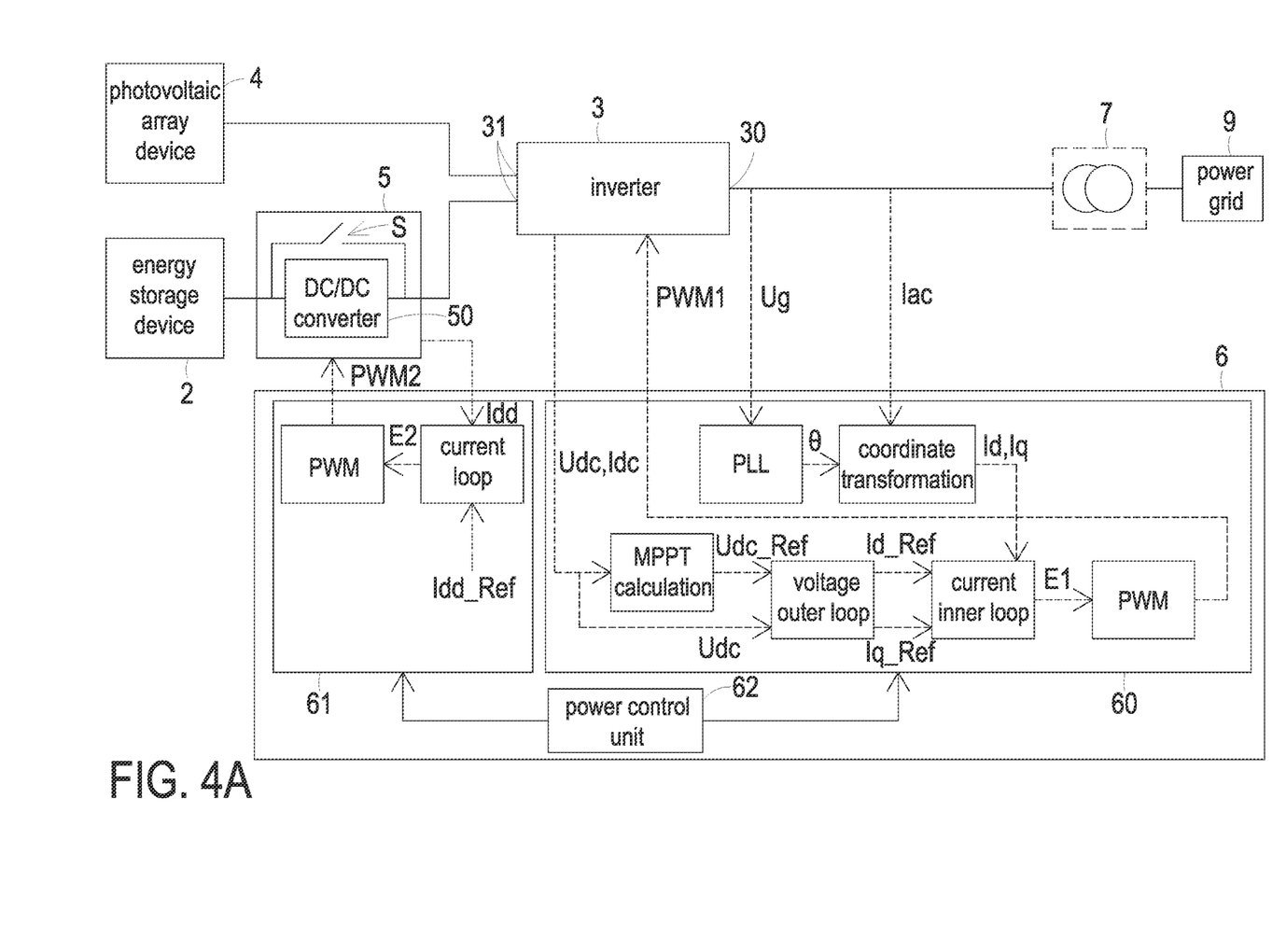
FIG. 4A is a schematic circuit diagram illustrating the operations of the controller of the photovoltaic energy storage system in the first working mode.
Figure 4B:
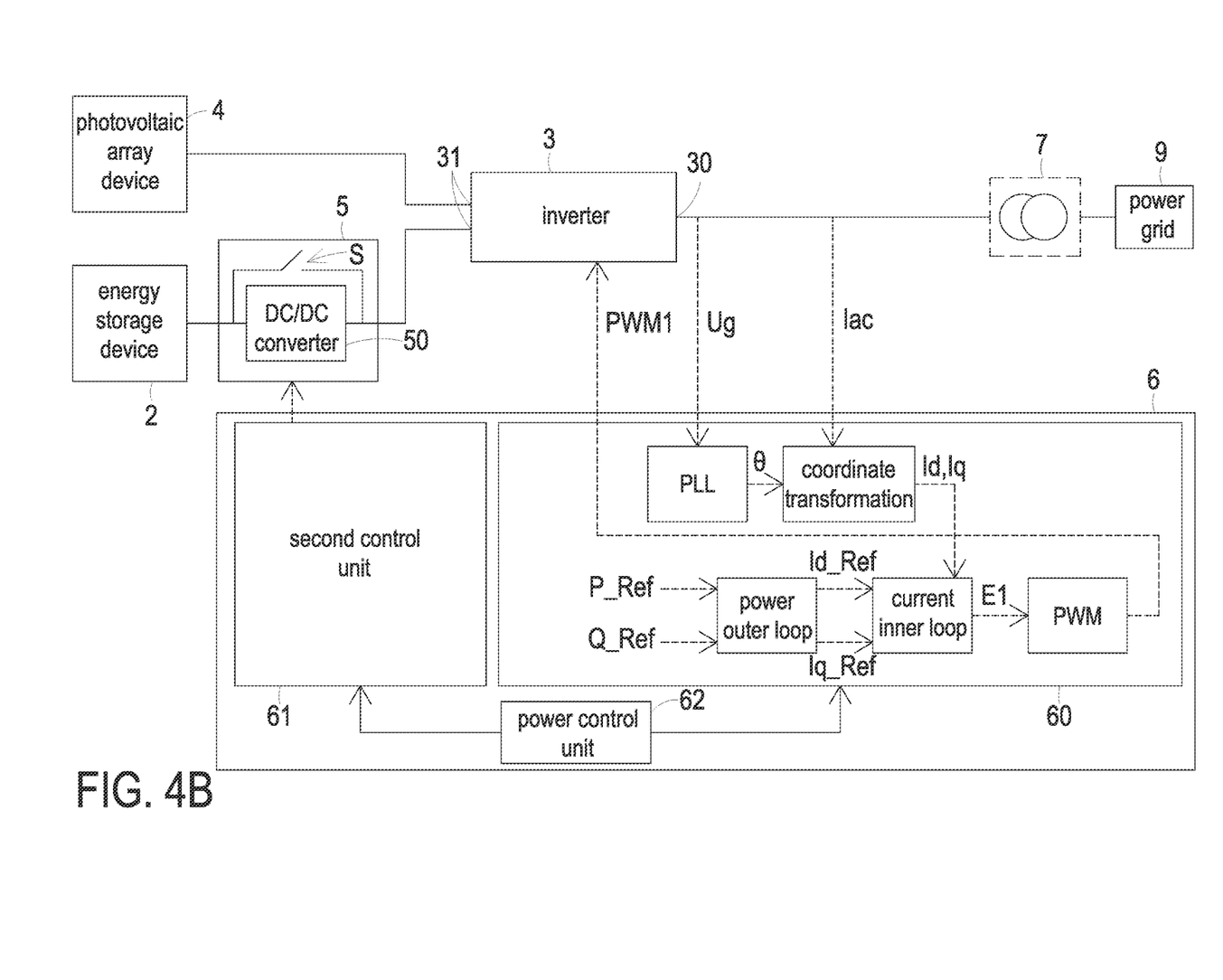
FIG. 4B is a schematic circuit diagram illustrating the operations of the controller of the photovoltaic energy storage system in the second working mode.

FIG. 4A is a schematic circuit diagram illustrating the operations of the controller of the photovoltaic energy storage system in the first working mode. FIG. 4B is a schematic circuit diagram illustrating the operations of the controller of the photovoltaic energy storage system in the second working mode.

Please refer to FIGS. 4A and 4B and also refer to FIGS. 1 and 2. In this embodiment, the controller 6 includes a first control unit 60, a second control unit 61 and a power control unit 62. The first control unit 60 is configured to control the operations of the inverter 3. The second control unit 61 is configured to control the operations of the DC/DC conversion device 5. The power control unit 62 is in communication with the first control unit 60 and the second control unit 61. Consequently, the first control unit 60 and the second control unit 61 can communicate with each other through the power control unit 62. In addition, the power control unit 62 can issue control commands to the first control unit 60 and the second control unit 61.

Please refer to FIG. 4A. When the controller 6 determines that the magnitude of the output voltage of the photovoltaic array device 4 is greater than or equal to the predetermined threshold value, the photovoltaic energy storage system 1 is operated in the first working mode under control of the controller 6. In the first working mode, the first control unit 60 of the controller 6 calculates the output power of the photovoltaic array device 4 according to a DC voltage Udc of the DC terminal 31 of the inverter 3 (or the output voltage from the photovoltaic array device 4) and an output current Idc of the photovoltaic array device 4. Consequently, the maximum power point tracking (MPPT) calculation is performed, and a DC voltage reference value Udc_Ref is obtained according to the result of the MPPT calculation. The DC voltage reference value Udc_Ref and the DC voltage Udc are inputted into a voltage outer loop. Consequently, an active current reference value Id_Ref and a reactive current reference value Iq_Ref are generated. After a grid voltage Ug from the power grid 9 is processed by a phase-locked loop (PLL) of the first control unit 60, an angle signal θ is generated. In addition, an AC current Iac from the AC terminal 30 of the inverter 3 and the angle signal θ are processed into an active current feedback value Id and a reactive current feedback value Iq by the first control unit 60 through a coordinate transformation. The active current reference value Id_Ref, the reactive current reference value Iq_Ref, the active current feedback value Id, and the reactive current feedback value Iq are inputted into a current inner loop. Consequently, a control signal E1 is generated by the current inner loop. Afterwards, the control signal E1 is converted into a pulse width modulation signal PWM1 by the first control unit 60 in a pulse width modulation (PWM) manner. In addition, the operation of the inverter 3 is controlled according to the pulse width modulation signal PWM1. Consequently, the DC voltage Udc of the DC terminal 31 of the inverter 3 can be stabilized, and the photovoltaic energy storage system 1 can be electrically connected to the grid. According to the present disclosure, the MPPT control mechanism is integrated into the control loop of the inverter 3, and it is not necessary to additionally install a stage of DC conversion circuit between the photovoltaic array device 4 and the inverter 3. Consequently, the photovoltaic array device 4 can be directly connected with the inverter 3, the structure of the photovoltaic energy storage system 1 is simplified, and the system efficiency is enhanced.

When the photovoltaic energy storage system 1 is operated in the first working mode, the power control unit 62 issues control command to the second control unit 61. The control commands contain the control command for turning off the bypass switch S, the control command for enabling the DC/DC converter 50 and a reference current command Idd_Ref. According to the control command from the power control unit 62, the bypass switch S is turned off and the DC/DC converter 50 is enabled under control of the second control unit 61. In addition, the reference current command Idd_Ref and an output current Idd of the DC/DC converter 50 are inputted into a current loop. Consequently, a control signal E2 is generated by the current loop. Afterwards, the control signal E2 is converted into a pulse width modulation signal PWM2 by the second control unit 61 in a pulse width modulation manner. In addition, the operation of the DC/DC converter 50 is controlled according to the pulse width modulation signal PWM2. Consequently, the output power or output current of the DC/DC converter 50 can be stabilized, and the energy storage device 2 can be charged through the DC/DC converter 50.

In case that the photovoltaic energy storage system 1 is operated in the first working mode and the output power of the photovoltaic array device 4 is greater than the rated power of the inverter 3, the controller 6 automatically determines the output power of the photovoltaic array device 4 through the communication between the first control unit 60, the second control unit 61 and the power control unit 62. Moreover, the power of the AC terminal 30 of the inverter 3 is controlled to be the rated power under control of the controller 6. Moreover, the controller 6 can automatically adjust the output current Idd of the DC/DC converter 50. Consequently, the photovoltaic array device 4 can be operated at the maximum power point. When the magnitude of the output power of the photovoltaic array device 4 is greater than the sum of the maximum power of the DC/DC converter 50 and the rated power of the inverter 3, the controller 6 automatically determines the output power of the photovoltaic array device 4. Moreover, under control of the controller 6, the DC/DC converter 50 is operated at the maximum power to charge the energy storage device 2, and the power at the AC terminal 30 of the inverter 3 is equal to the rated power. Consequently, the output power of the photovoltaic array device 4 will be automatically decreased and stabilized to the power balance point at the right side of the maximum power point. In this way, the photovoltaic energy storage system 1 can track the maximum power in the full range of the output power of the photovoltaic array device 4.

Please refer to FIG. 4B. When the controller 6 determines that the magnitude of the output voltage from the photovoltaic array device 4 is lower than the predetermined threshold value, the photovoltaic energy storage system 1 is operated in the second working mode. Meanwhile, a first control command is transmitted from the power control unit 62 to the first control unit 60. The first control command contains an active power reference value P_Ref and a reactive power reference value Q_Ref. The active power reference value P_Ref and the reactive power reference value Q_Ref are inputted into a power outer loop of the first control unit 60. Consequently, an active current reference value Id_Ref and a reactive current reference value Iq_Ref are generated. Moreover, according to the grid voltage Ug from the power grid 9, the first control unit 60 generates an angle signal θ through the phase-locked loop. In addition, the AC current Iac from the AC terminal 30 of the inverter 3 and the angle signal θ are processed into an active current feedback value Id and a reactive current feedback value Iq by the first control unit 60 through a coordinate transformation. The active current reference value Id_Ref, the reactive current reference value Iq_Ref, the active current feedback value Id and the reactive current feedback value Iq are inputted into a current inner loop. Consequently, a control signal E1 is generated by the current inner loop. Afterwards, the control signal E1 is converted into a pulse width modulation signal PWM1 by the first control unit 60 in a pulse width modulation manner. In addition, the operation of the inverter 3 is controlled according to the pulse width modulation signal PWM1. Consequently, the output power of the AC terminal 30 of the inverter 3 can be stabilized.

When the photovoltaic energy storage system 1 is operated in the second working mode, a second control command is transmitted from the power control unit 62 to the second control unit 61. The second control command contains the command of turning on the bypass switch S and the command of disabling the DC/DC converter 50. According to the second control command form the power control unit 62, the bypass switch S is turned on and the DC/DC converter 50 is disabled.

In the embodiment of FIG. 4A and the FIG. 4B, each of the voltage outer loop, the power outer loop, the current inner loop and the current loop may include an error calculation unit and a proportional integral (PI) adjustment unit. It is noted that the constituents of these components are not restricted.

Figure 5:
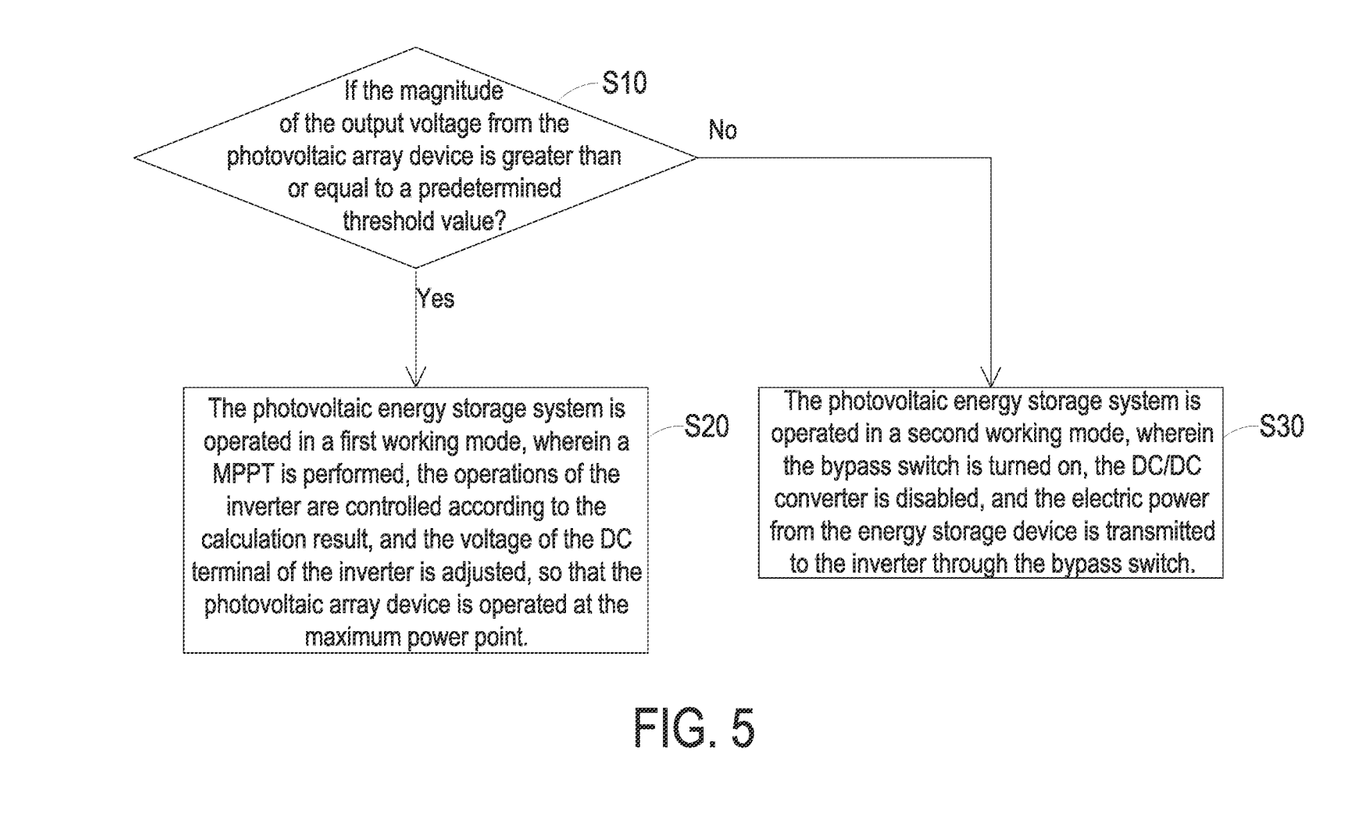
FIG. 5 schematically illustrates a flowchart of a control method for a photovoltaic energy storage system according to an embodiment of the present disclosure.

FIG. 5 schematically illustrates a flowchart of a control method for a photovoltaic energy storage system according to an embodiment of the present disclosure. The control method is applied to the photovoltaic energy storage system of FIG. 1. Please refer to FIGS. 1, 4A, 4B and 5. The control method includes the following steps.

Firstly, in a step S10, the controller 6 determines whether the magnitude of the output voltage from the photovoltaic array device 4 is greater than or equal to a predetermined threshold value.

If the determining result of the step S10 indicates that the magnitude of the output voltage from the photovoltaic array device 4 is greater than or equal to the predetermined threshold value, the photovoltaic energy storage system 1 is operated in a first working mode under control of the controller 6 (Step S20). In the first working mode, the controller 6 performs a maximum power point tracking (MPPT) calculation. Moreover, the controller 6 controls the operations of the inverter 3 according to the calculation result and thus adjusts the voltage of the DC terminal 31 of the inverter 3. Consequently, the photovoltaic array device 4 can be operated at the maximum power point.

If the determining result of the step S10 indicates that the magnitude of the output voltage from the photovoltaic array device 4 is lower than a predetermined threshold value, the photovoltaic energy storage system 1 is operated in a second working mode under control of the controller 6 (Step S30). In the second working mode, the bypass switch S is turned on and the DC/DC converter 50 is disabled. Meanwhile, the electric power from the energy storage device 2 is transmitted to the inverter 3 through the bypass switch S. Moreover, under control of the controller 6, the storage voltage from the energy storage device 2 is converted into an AC voltage by the inverter 3.

In the step S20, the photovoltaic energy storage system 1 is operated in the first working mode, and the bypass switch S is turned off and the DC/DC converter 50 is enabled under control of the controller 6. In some embodiments, the step S20 further includes the following steps. Firstly, the controller 6 calculates the output power of the photovoltaic array device 4 according to a DC voltage Udc of the DC terminal 31 of the inverter 3 and an output current Idc of the photovoltaic array device 4. Consequently, the maximum power point tracking (MPPT) calculation is performed, and a DC voltage reference value Udc_Ref is obtained according to the result of the MPPT calculation. Then, the controller 6 obtains an active current reference value Id_Ref and a reactive current reference value Iq_Ref according to the DC voltage reference value Udc_Ref and the DC voltage Udc of the DC terminal 31 of the inverter 3. Then, the controller 6 obtains an active current feedback value Id and a reactive current feedback value Iq according to an AC current Iac from the AC terminal 30 of the inverter 3. Then, the controller 6 generates a control signal E1 according to the active current reference value Id_Ref, the reactive current reference value Iq_Ref, the active current feedback value Id and the reactive current feedback value Iq. Then, the controller 6 generates a pulse width modulation signal PWM1 according to the control signal E1. In addition, the operation of the inverter 3 is controlled according to the pulse width modulation signal PWM1.

In some embodiments, the step S20 further includes the following steps. When the output power of the photovoltaic array device 4 is greater than the rated power of the inverter 3, the inverter 3 is maintained at its rated power under control of the controller 6. The excess portion of the DC output power of the photovoltaic array device 4 is provided to the energy storage device 2 through the DC/DC converter 50.

In some embodiments, the step S20 further includes the following steps. Firstly, the controller 6 generates a control signal E2 according to a reference current command Idd_Ref and an output current Idd from the DC/DC converter 50. Then, the controller 6 generates a pulse width modulation signal PWM2 according to the control signal E2. In addition, the operation of the DC/DC converter 50 is controlled according to the pulse width modulation signal PWM2.

In some embodiments, the step S30 further includes the following steps. Firstly, the controller 6 generates an active current reference value Id_Ref and a reactive current reference value Iq_Ref according to an active power reference value P_Ref and a reactive power reference value Q_Ref. Then, the controller 6 obtains an active current feedback value Id and a reactive current feedback value Iq according to an AC current Iac from the AC terminal 30 of the inverter 3. Then, the controller 6 generates a control signal E1 according to the active current reference value Id_Ref, the reactive current reference value Iq_Ref, the active current feedback value Id and the reactive current feedback value Iq. Then, the controller 6 generates a pulse width modulation signal PWM1 according to the control signal E1. In addition, the operation of the inverter 3 is controlled according to the pulse width modulation signal PWM1.

In some embodiments, the photovoltaic energy storage system 1 is equipped with the protection switch 8. When the photovoltaic energy storage system 1 is operated in the first working mode (i.e., in the step S20), the protection switch 8 is turned on. When the photovoltaic energy storage system 1 is operated in the second working mode (i.e., in the step S30), the protection switch 8 is turned off. In case that the protection switch 8 is a controllable switch, the controller 6 issues a corresponding control signal according to the operation mode of the photovoltaic energy storage system 1, and the protection switch 8 is selectively turned on or turned off according to the control signal. In case that the protection switch 8 is a diode, it is not necessary to issue the control signal because the diode allows current to flow in one direction. For example, when the output voltage from the photovoltaic array device 4 is greater than or equal to the voltage of the DC terminal 31 of the inverter 3, the diode is automatically turned on. Whereas, when the output voltage from the photovoltaic array device 4 is lower than the voltage of the DC terminal 31 of the inverter 3, the diode is in the reverse cutoff state. Consequently, the photovoltaic array device 4 will not receive the reverse power flow.

From the above descriptions, the present disclosure provides the photovoltaic energy storage system and the control method of the photovoltaic energy storage system. The DC/DC conversion device includes a bypass switch and a DC/DC converter, which are electrically connected with each other in parallel. When the photovoltaic storage energy system is operated in the second working mode, the electric power of the energy storage device is transmitted to the inverter through the bypass switch. In addition, the electric power of the energy storage device does not need to be transmitted through the DC/DC converter. Since the electric power does not need to be transferred through too many circuit or conversion stages, the power loss is reduced when compared with the conventional photovoltaic energy storage system. When the photovoltaic energy storage system is operated in the first working mode, the controller performs the maximum power point tracking (MPPT) calculation. Furthermore, the controller controls the operations of the inverter according to the calculation result. Consequently, the photovoltaic array device can be operated at the maximum power point. In this way, the efficiency of the photovoltaic energy storge system is improved, and the voltage of the DC terminal of the inverter is stabilized.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A photovoltaic energy storage system, comprising:
   an energy storage device;
   an inverter comprising a DC terminal and an AC terminal, wherein the AC terminal is electrically coupled with a power grid;

a photovoltaic array device electrically connected with the DC terminal of the inverter directly, wherein when a magnitude of an output voltage of the photovoltaic array device is greater than or equal to a predetermined threshold value, the photovoltaic energy storage system is operated in a first working mode, wherein when the magnitude of the output voltage of the photovoltaic array device is lower than the predetermined threshold value, the photovoltaic energy storage system is operated in a second working mode;

a DC/DC conversion device electrically connected between the energy storage device and the DC terminal of the inverter, wherein the DC/DC conversion device comprises a bypass switch and a DC/DC converter, which are electrically connected with each other in parallel; and a controller for controlling an operation of the inverter and an operation of the DC/DC conversion device, wherein when the photovoltaic energy storage system is operated in the first working mode, the controller performs a maximum power point tracking calculation, and controls the operation of the inverter according to a result of the maximum power point tracking calculation, so that a voltage of the DC terminal of the inverter is adjusted, wherein when the photovoltaic energy storage system is operated in the second working mode, the bypass switch is turned on and the DC/DC converter is disabled under control of the controller, so that an electric power of the energy storage device is transmitted to the inverter through the bypass switch.

2. The photovoltaic energy storage system according to claim 1, wherein a working voltage range of the energy storage device matches a working voltage range of the inverter.

3. The photovoltaic energy storage system according to claim 1, wherein the bypass switch is an isolated switch, a contactor, a relay or a semiconductor switch.

4. The photovoltaic energy storage system according to claim 1, wherein the DC/DC converter is a unidirectional DC/DC converter.

5. The photovoltaic energy storage system according to claim 1, wherein when the photovoltaic energy storage system is operated in the first working mode and an output power of the photovoltaic array device is greater than a rated power of the inverter, the bypass switch is turned off and the DC/DC converter is enabled under the control of the controller, so that a portion of an electric power from the photovoltaic array device is transmitted to the energy storage device through the DC/DC converter.

6. The photovoltaic energy storage system according to claim 1, wherein the photovoltaic energy storage system further comprises a protection switch, and the protection switch is electrically connected between the photovoltaic array device and the DC terminal of the inverter, wherein when the photovoltaic energy storage system is operated in the first working mode, the protection switch is turned on, wherein when the photovoltaic energy storage system is operated in the second working mode, the protection switch is turned off.

7. The photovoltaic energy storage system according to claim 6, wherein the protection switch is a mechanical switch or a diode.

8. A control method for a photovoltaic energy storage system, the photovoltaic energy storage system comprising an energy storage device, an inverter, a photovoltaic array device and a DC/DC conversion device, an AC terminal of the inverter being electrically coupled with a power grid, the photovoltaic array device being electrically connected with a DC terminal of the inverter, the DC/DC conversion device being electrically connected between the energy storage device and the DC terminal of the inverter, the DC/DC conversion device comprising a bypass switch and a DC/DC converter, which are electrically connected with each other in parallel, the control method comprising steps of:

determining whether a magnitude of an output voltage of the photovoltaic array device is greater than or equal to a predetermined threshold value;

when the magnitude of the output voltage of the photovoltaic array device is greater than or equal to the predetermined threshold value, allowing the photovoltaic energy storage system to be operated in a first working mode, wherein in the first working mode, a controller performs a maximum power point tracking calculation, and controls the operation of the inverter according to a result of the maximum power point tracking calculation, so that a voltage of the DC terminal of the inverter is adjusted; and when the magnitude of the output voltage of the photovoltaic array device is lower than the predetermined threshold value, allowing the photovoltaic energy storage system to be operated in a second working mode, wherein in the second working mode, the bypass switch is turned on and the DC/DC converter is disabled under control of the controller, so that an electric power of the energy storage device is transmitted to the inverter through the bypass switch.

9. The control method according to claim 8, wherein when the photovoltaic energy storage system is operated in the first working mode, the controller performs steps of:

calculating an output power of the photovoltaic array device according to a DC voltage of the DC terminal of the inverter and an output current of the photovoltaic array device, performing the maximum power point tracking calculation, and obtaining a DC voltage reference value according to the result of the maximum power point tracking calculation;

obtaining an active current reference value and a reactive current reference value according to the DC voltage reference value and the DC voltage of the DC terminal of the inverter;

obtaining an active current feedback value and a reactive current feedback value according to an AC current of the AC terminal of the inverter;

generating a control signal according to the active current reference value, the reactive current reference value, the active current feedback value and the reactive current feedback value; and generating a pulse width modulation signal according to the control signal, and controlling the operation of the inverter according to the pulse width modulation signal.

10. The control method according to claim 8, wherein when the photovoltaic energy storage system is operated in the first working mode and an output power of the photovoltaic array device is greater than a rated power of the inverter, the inverter is maintained at the rated power under control of the controller.

11. The control method according to claim 8, wherein a working voltage range of the energy storage device matches a working voltage range of the inverter.

12. The control method according to claim 8, wherein the photovoltaic energy storage system further comprises a protection switch, and the protection switch is electrically connected between the photovoltaic array device and the DC terminal of the inverter, wherein when the photovoltaic energy storage system is operated in the first working mode, the protection switch is turned on, wherein when the photovoltaic energy storage system is operated in the second working mode, the protection switch is turned off.

13. The control method according to claim 8, wherein when the photovoltaic energy storage system is operated in the first working mode and an output power of the photovoltaic array device is greater than a rated power of the inverter, the bypass switch is turned off and the DC/DC converter is enabled under the control of the controller, so that a portion of an electric power from the photovoltaic array device is transmitted to the energy storage device through the DC/DC converter.

* * * * *